(12) United States Patent
Leuze

(10) Patent No.: US 6,354,179 B1
(45) Date of Patent: Mar. 12, 2002

(54) FIXING DEVICE FOR TOOLS

(75) Inventor: Peter Leuze, Walheim (DE)

(73) Assignee: Komet Praezisionswerkezeuge Robert Breuning GmbH, Besigheim (DE)

( * ) Notice: Subject to any disclaimer, the term of this patent is extended or adjusted under 35 U.S.C. 154(b) by 0 days.

(21) Appl. No.: 09/402,847

(22) PCT Filed: Feb. 11, 1998

(86) PCT No.: PCT/EP98/00758

§ 371 Date: Jan. 18, 2000

§ 102(e) Date: Jan. 18, 2000

(87) PCT Pub. No.: WO98/45075

PCT Pub. Date: Oct. 15, 1998

(30) Foreign Application Priority Data

Apr. 8, 1997 (DE) ........................................ 197 14 398

(51) Int. Cl.[7] ........................ B23B 29/08; B23B 31/107
(52) U.S. Cl. ........................ 82/160; 407/108; 407/106; 407/11; 279/77
(58) Field of Search .............................. 407/10, 9, 106, 407/107, 108, 11, 113; 82/160, 161; 279/77, 86, 76

(56) References Cited

U.S. PATENT DOCUMENTS

| | | | | |
|---|---|---|---|---|
| 178,170 A | * | 8/1876 | Lingard | 407/11 |
| 1,111,181 A | * | 9/1914 | Rikof | 407/108 |
| 1,214,498 A | * | 2/1917 | Armstrong | 407/108 |
| 1,406,265 A | * | 2/1922 | Lawson | 407/113 |
| 1,458,973 A | | 6/1923 | Bufford | |
| 1,785,495 A | * | 12/1930 | Richard | 279/77 |
| 1,861,504 A | * | 6/1932 | Maxfield | 279/77 |
| 2,203,104 A | * | 6/1940 | Reaney | 407/108 |
| 2,288,004 A | * | 6/1942 | Lauderdale | 82/161 |
| 2,781,199 A | * | 2/1957 | Veldhuizen | 279/77 |
| 2,816,770 A | * | 12/1957 | Vlieg et al. | 279/77 |
| 3,518,737 A | * | 7/1970 | Hood | 407/113 |
| 3,887,974 A | * | 6/1975 | Sorice | 407/113 |
| 4,775,268 A | * | 10/1988 | Michalon | 407/9 |
| 4,832,546 A | * | 5/1989 | Potemkin | 279/76 |
| 4,981,057 A | * | 1/1991 | Von Haas et al. | 82/160 |
| 5,088,861 A | * | 2/1992 | Little | 407/11 |
| 5,452,631 A | * | 9/1995 | Erickson | 82/160 |
| 5,555,784 A | * | 9/1996 | Muendlein et al. | 82/158 |
| 5,851,091 A | * | 12/1998 | Klement | 82/160 |

FOREIGN PATENT DOCUMENTS

| | | |
|---|---|---|
| CH | 664 520 | 3/1988 |
| DE | 828 034 | 1/1952 |
| DE | 1 079 923 | 4/1960 |
| DE | 1 106 145 | 5/1961 |
| DE | G 85 23 488.5 | 11/1985 |
| DE | 36 02 247 | 7/1987 |
| DE | 42 12 709 | 10/1993 |
| DE | 43 34 852 | 4/1995 |
| DE | 44 11 541 | 10/1995 |
| FR | 2399889 A1 * | 3/1979 |

* cited by examiner

Primary Examiner—William Briggs
Assistant Examiner—Erica Ergenbright
(74) Attorney, Agent, or Firm—Flynn, Thiel, Boutell & Tanis, P.C.

(57) ABSTRACT

A fixing device for fixing a tool, preferably a turning tool, to a toolholder, includes a shank and at least one cutting part. The toolholder has an insertion opening for accommodating the tool shank. The fixing device includes a clamping element which is stored in such a way that it can partially rotate in the holder around an axis of rotation which is perpendicular to the axis of insertion of the insertion opening. The clamping element also includes a partially cylindrical surface section which is eccentric in relation to the axis of rotation. Furthermore, the shank surface has a partially cylindrical, open-edged recess perpendicular to the shank axis, into which recess the clamp element can be screwed by its partially cylindrical surface section when mounting the tool shank.

15 Claims, 4 Drawing Sheets

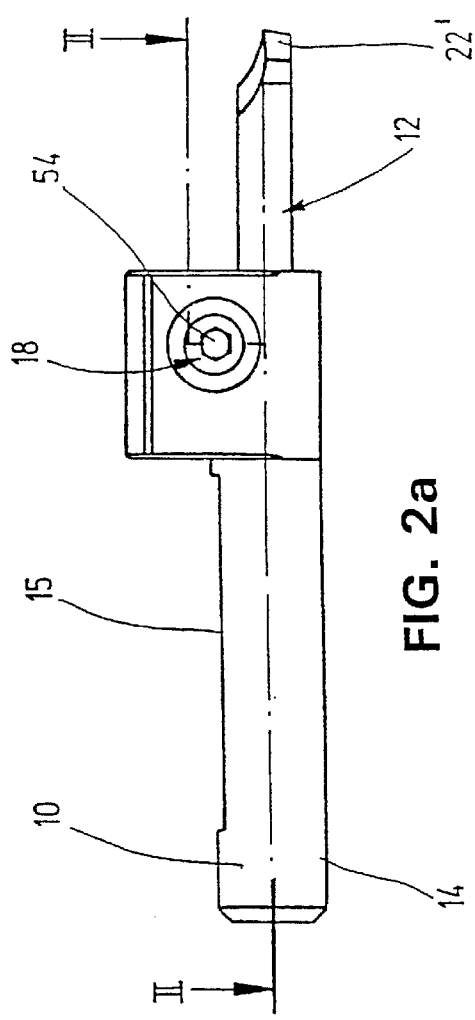
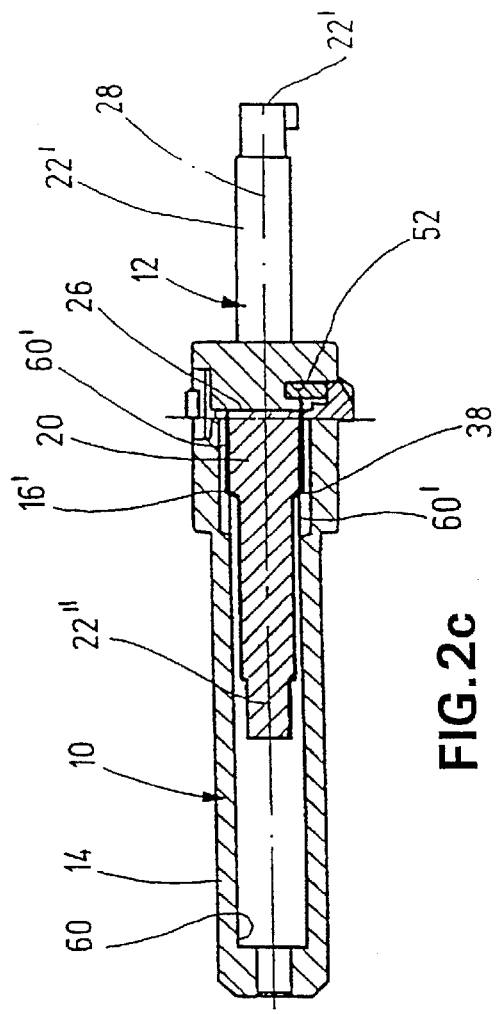
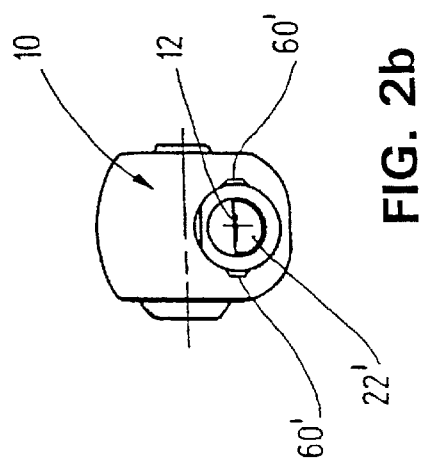
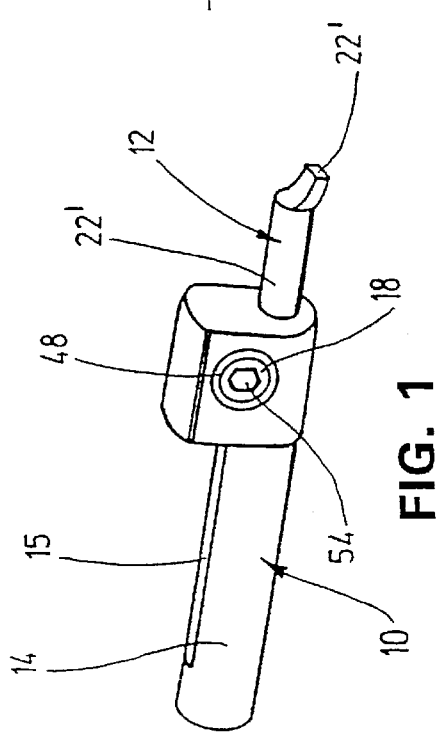

FIXING DEVICE FOR TOOLS

FIELD OF THE INVENTION

The invention concerns a device for fixing a tool, having a shank and a cutting part and preferably designed as a turning tool, to a holder having an insertion opening for accommodating the tool shank.

BACKGROUND OF THE INVENTION

Fixing devices of the type specified at the beginning are intended to position and clamp a turning tool both axially and radially and in the circumferential direction. The holder is for its part inserted into a receptacle of a lathe or machining center and securely held there by means of a tool coupling. In the case of a known fixing device of the type stated, a tightening screw is provided in the holder and presses the prismatically shaped shank of the turning tool into a complementary prismatic receptacle. Good positioning in the circumferential direction is obtained as a result. The axial alignment is achieved by an axial stop, against which the turning tool is pressed during manual tightening. This type of handling during fixing is felt to be relatively laborious. Added to this is the fact that the insertion opening for the turning tool is not of a rotationally symmetrical design, with the result that different holders have to be provided for left-turning and right-turning tools. Owing to the stop inside the insertion openings that is necessary for the axial positioning, only single-cutting turning tools can be inserted into the holder and fixed to it.

On this basis, the object of the invention is to develop a fixing device of the type specified at the beginning which permits exact automatic positioning of the tool in the holder both in the circumferential direction and in the axial and radial directions, ensures high rigidity and nevertheless is easy to handle during the fixing operation.

SUMMARY OF THE INVENTION

The essence of the invention is that in the holder there is arranged a clamping element which is mounted in such a way that it can rotate to a restricted extent about an axis of rotation aligned transversely to the axis of insertion of the insertion opening and has a partially cylindrical surface portion which is eccentric in relation to its axis of rotation, and that in the shank surface there is arranged an open-edged, partially cylindrical recess which is aligned transversely to the shank axis and into which the clamping element can be screwed by its partially cylindrical surface portion, thereby fixing the tool shank and setting a position of the cutting edge that is defined with respect to the holder.

To be able to introduce the tool into the insertion opening easily when the clamping element is in the open position, it is advantageous if the clamping element has a top surface which, in its one turning end position, faces the insertion opening and exposes the latter for the passing through of the shank. For the precentering of the tool in the essentially cylindrical insertion opening, it is also advantageous if the cylindrical tool shank has an aligning surface which can be aligned parallel to the top surface and is parallel to the axis of the shank and the axis of the recess. If, in addition to this, the axis of the recess is aligned perpendicularly to the main cutting force acting at the cutting part, tools both for right-turning and for left-turning machining can be inserted into one and the same holder.

The eccentricity of the partially cylindrical surface portion is expediently dimensioned such that the surface portion comes into contact with the cylindrical surface of the recess and clamps the shank of the tool in the wall of the insertion opening when the clamping element is partially turned. The transverse alignment of the axis of the recess to the axis of insertion has the effect of achieving positioning both in the circumferential direction and in the axial and radial directions. Particularly high accuracy in longitudinal positioning is achieved if, in its fixing position, the clamping element bears with the partially cylindrical surface portion against the bottom of the partially cylindrical recess, of a slightly larger diameter, in such a way that the joining plane between the axis of rotation and the axis of eccentricity forms an angle of 3° to 35°, preferably 5° to 15°, with a radial plane of the tool shank that is perpendicular to the axis of insertion.

A recess for accommodating the clamping element is preferably arranged in the holder, which recess is concentric with respect to the axis of rotation, partially cylindrical, open-edged toward the insertion opening and, in the clamping position of the shank, is complemented by the partially cylindrical recess of the shank to form a full cylinder. Furthermore, according to a preferred refinement of the invention, an axial limiting stop for the tool is arranged on the holder, the recess being open toward the clamping element when the tool is bearing against the limiting stop, and it being possible during the fixing operation for the tool to lift automatically off the limiting stop counter to the direction of insertion, thereby setting a defined axial position of the cutting edge. The limiting stop is in this case expediently arranged in the insertion opening such that, in the direction of insertion, it is behind the clamping element. It may be designed, for example, as a pin, wedge or lug engaging in the insertion opening. Another configurational variant provides that the insertion opening is designed as a locating hole for the tool shank and the limiting stop is designed as an annular shoulder bounding the locating hole.

Particularly reliable fixing, which cannot be released during the machining operation, is achieved with the means according to the invention by the clamping element being mounted in such a way that it can rotate at both its ends at bearing locations of the holder and being able during the clamping operation to bend flexibly between the bearing locations, thereby producing a self-locking frictional connection and eliminating radial and axial shank backlash in the insertion opening. These measures additionally lead to a high positioning accuracy, since the clamping element in its flexibly bent fixing state is pressed to a greater extent against the wall of the recess near its extreme ends than in its middle. If it is additionally considered that the shank in the fixing state is pressed against the wall of the opening lying opposite the clamping element, three-point pressing contact with high positioning accuracy is obtained in the direction of fixing exerted by the clamping element on the shank.

The measures according to the invention make it possible for there to be formed on the end face of the shank lying at the opposite end from the cutting part a second cutting part, which when not in use can be introduced into the correspondingly lengthened insertion opening in the holder and protected there against destruction.

The handling of the fixing device according to the invention is made easier if the clamping element can be turned between a first end position, exposing the insertion opening for the passing through of the shank, and a second end position, forming a securement against turning for the clamping element in the holder, the end positions being defined by stops. The clamping element may for this purpose have on its one extreme end a head engaging in a turned relief of the holder, the stops being arranged such that they are outwardly covered by the head in a protected position within the turned relief. Furthermore, the clamping element may have at each of both its extreme ends a wrench socket, in order that it can be operated from both sides.

According to a further advantageous refinement of the invention, the tool holder is axially penetrated by a coolant duct. It is particularly advantageous in this case if, outside the portion accommodating the shank, preferably designed as a locating hole, the coolant duct is formed by the insertion opening and, within the portion accommodating the shank, it is formed by at least one axially parallel recess which is open-edged toward the insertion opening and additionally bounded there by the shank.

BRIEF DESCRIPTION OF THE DRAWINGS

The invention is explained in more detail below on the basis of an exemplary embodiment represented schematically in the drawing, in which:

FIG. 1 shows a tool holder with inserted turning tool in a diagrammatic representation;

FIGS. 2a and 2b show a side view and an end-on view of the tool holder according to FIG. 1;

FIG. 2c shows a stepped section along the sectional line II—II of FIG. 2a;

DETAILED DESCRIPTION

Figure 3:
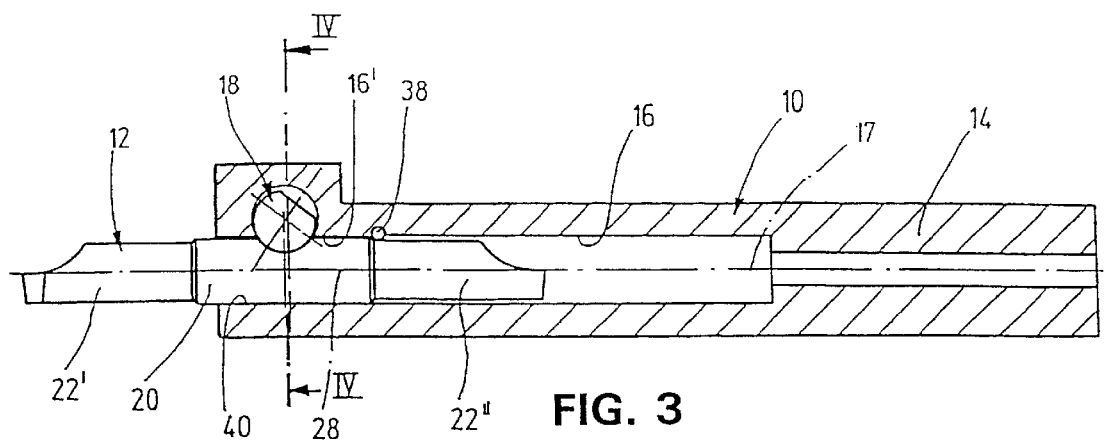
FIG. 3 shows a longitudinal section through the tool holder with inserted, double-sided turning tool.

The tool holder 10 represented in the drawing is intended as a tool holder for tools 12 designed as turning tools. The tool holder 10 is intended for fitting into a lathe and has for this purpose in the case of the exemplary embodiment shown a cylindrical shank 14 with at least one clamping surface 15 for fixing into a prismatic, cylindrical or partially cylindrical receptacle of a lathe turret. The holder 10 is, furthermore, provided with a cylindrical bore, designed as an insertion opening 16, as well as with a clamping mechanism 18 for fixing the tool 12. The tool 12 has for this purpose an essentially cylindrical shank 20, on each of the end faces of which there is formed a cutting part 22', 22", facing toward opposite sides.

Figure 4A:
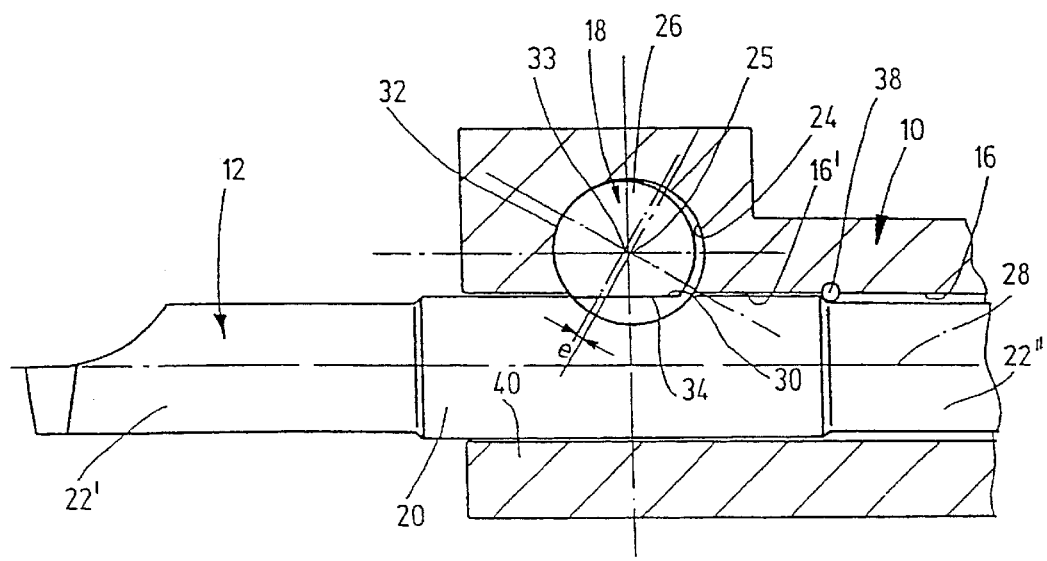
FIGS. 4a and 4b show an enlarged detail from FIG. 3 for various positions of the eccentric clamping element.

The clamping mechanism 18 comprises a clamping element 26 which is arranged in such a way that it can rotate to a restricted extent in a recess 24 which is aligned with its axis 25 transversely to the axis 17 of the insertion opening 16 and is open-edged toward the insertion opening 16, and a partially cylindrical recess 30 which is arranged in the surface of the shank 20 and runs transversely to the shank axis 28. The clamping element 26 is mounted at its extreme ends, in each case in a bearing location 31 of the holder 10, in such a way that it can rotate about the axis 25 of the recess 24 and has a partially cylindrical surface 32 which is eccentric in relation to the axis of rotation 25. The eccentricity e between the axis of rotation 25 and the partially cylindrical surface 32 of the clamping element 26 is evident from FIGS. 4a and b. The clamping element 26 is additionally provided on its surface with a top surface 34, which in the end position of the clamping element 26 shown in FIG. 4a faces the insertion opening 16 and exposes the latter for the passing through of the tool shank 20.

To permit a precentering of the tool 12 during the insertion operation, the latter is provided with an aligning surface 36 which can be aligned parallel to the top surface 34 and is parallel to the axis of the shank 28 and the axis of the recess 25. Furthermore, within the insertion opening 16 a limiting stop 38 is arranged behind the clamping element 26 in the direction of insertion in such a way that, although it exposes the passage for the cutting part 22" during the insertion operation, it limits the insertion distance of the shank 20 in such a way that the open-edged recess 30 comes into the range of action of the clamping element 26. In the case of the exemplary embodiment according to FIGS. 3 and 4, the limiting stop 38 is indicated as a pin engaging in the insertion opening 16 at the end of the portion 16' accommodating the shank 20, while in the case of the exemplary embodiment according to FIG. 2c the portion 16' of the insertion opening 16 accommodating the shank 20 is designed as a locating hole for the tool shank and the limiting stop 38 is designed as an annular shoulder bounding the locating hole.

Figure 4B:
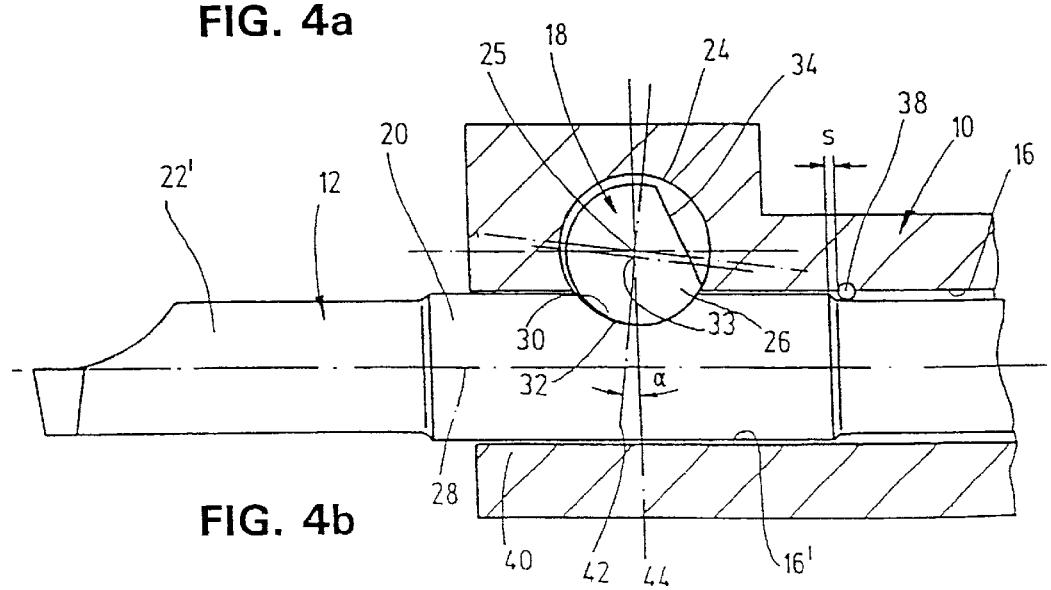
Figure 4C:
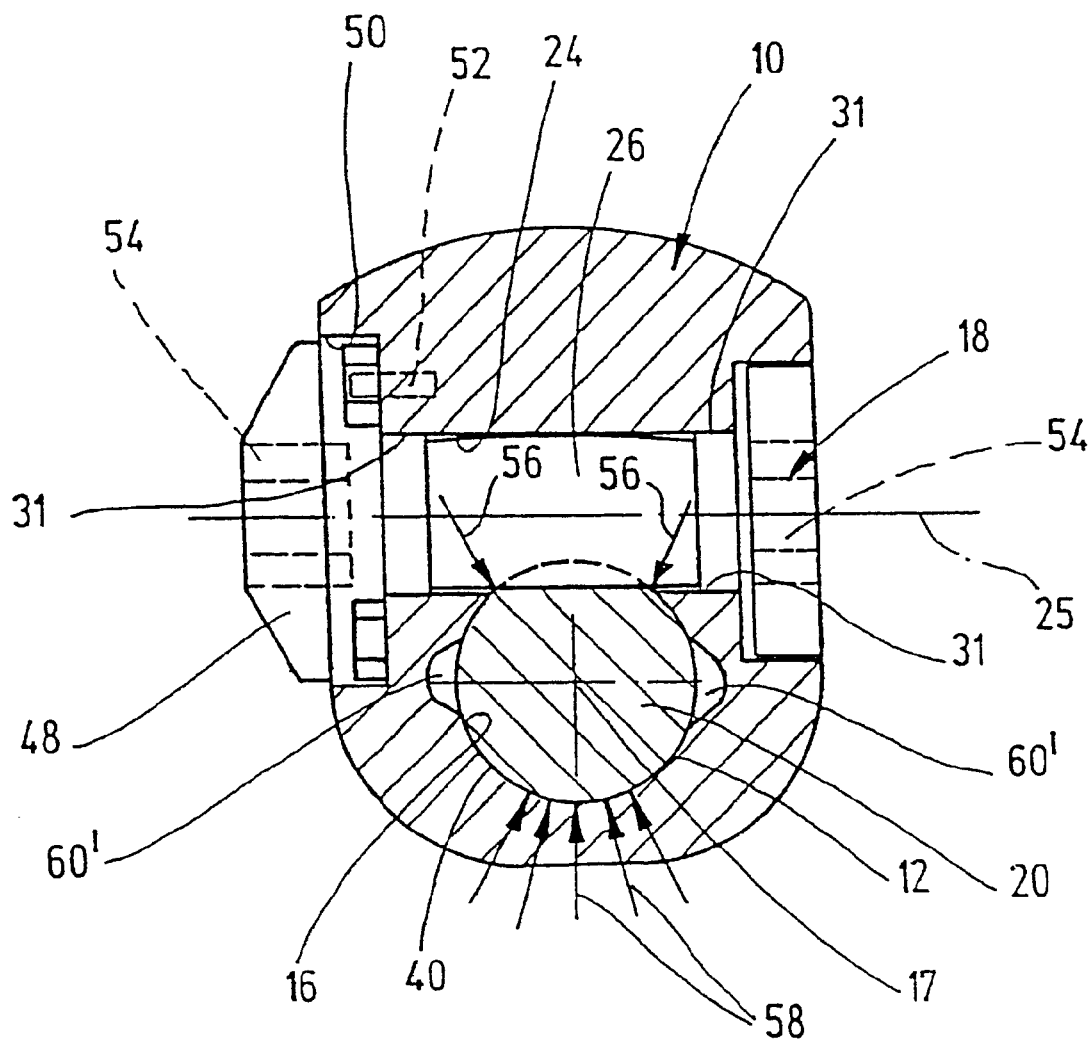
FIG. 4c shows a section along the sectional line IV—IV of FIG. 3.

The clamping element 26 has a head 48 which is arranged at the end and with which it engages in a turned relief 50 of the holder. Also located in the turned relief 50, in an annular space outwardly covered by the head 48, is a stop bolt 52, which limits the angle of rotation of the clamping element 26 to about 160°. For turning, a wrench socket 54, designed for example as a polygonal opening, is provided in the head 48. If the clamping element 26 is turned about its axis of rotation 25 from the position according to FIG. 4a into the position shown in FIG. 4b, its eccentric, partially cylindrical surface 32 penetrates into the partially cylindrical recess 30 of the shank 20 and, in the end position shown in FIG. 4b, clamps the shank 20 with the bore wall 40 of the insertion opening 16. At the same time, the shank 20 is lifted off the limiting stop 38, by the dimension s, by means of the clamped-together cylindrical surfaces of the clamping element 26 and the recess 30 and is automatically positioned in the axial direction. In addition, an exact positioning in the radial direction and in the circumferential direction of the tool 12 in relation to the holder 10 is obtained during the clamping operation. Since the clamping element, mounted at both its ends at the bearing locations 31 of the holder 10, can be bent flexibly between the bearing locations, a self-locking frictional connection is obtained during the clamping operation within the clamping mechanism 18, which is not released even in a vibrational machining operation. The bending of the clamping element leads to a preferred pressing contact at the ends of the bottom of the recess in the direction of the arrows 56, with the result that three-point bearing contact with high positioning accuracy of the tool 12 in the holder 10 is obtained in connection with the forces of reaction according to the arrows 58. A further improvement in this respect is achieved if the eccentricity e is dimensioned such that, in its fixing position shown in FIG. 4a, the clamping element bears with its partially cylindrical surface portion 32 against the bottom of the partially cylindrical recess, 30 in such a way that the joining plane 42 between the axis of rotation 25 and the axis of eccentricity 33 forms an angle α of 5° to 15° with a plane 44 perpendicular to the axis of the shank 28 (FIG. 4b).

Figure 5A:
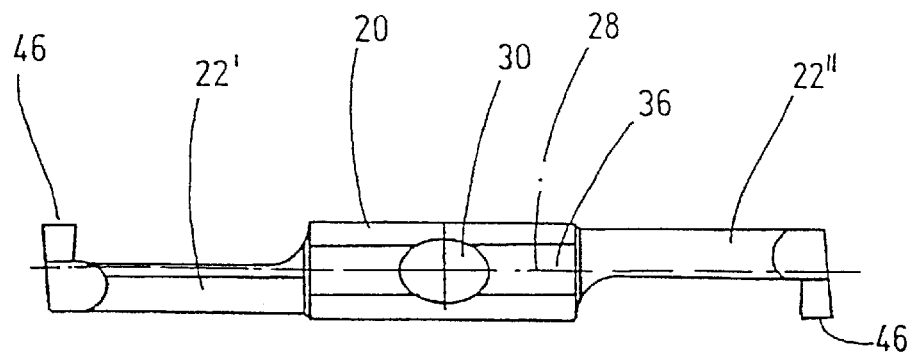
FIGS. 5a and b each show a turning tool designed as a recessing tool for left-turning and right-turning workpiece machining.
Figure 5B:
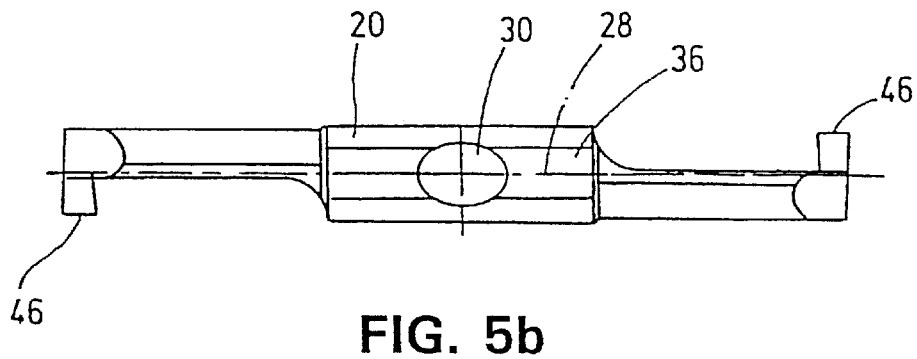
Figure 6:
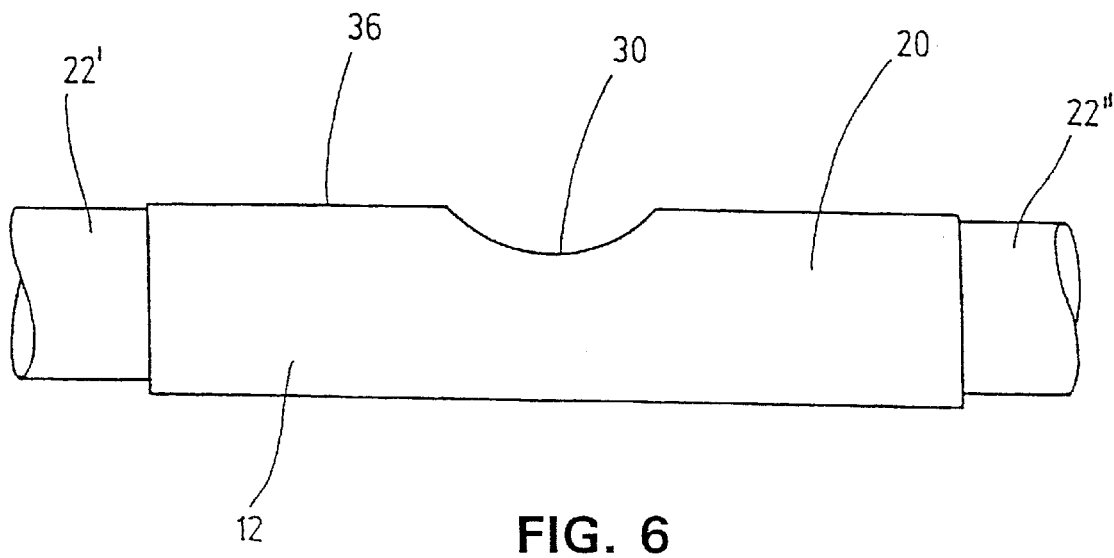
FIG. 6 show s an enlarged side view in the for m of a detail of the turning tool according to FIGS. 4a and b.

Since, in the case of the exemplary embodiment shown in FIGS. 5a and b, the open-edged recess 30 is aligned with its axis 25 perpendicular to the main cutting forces acting at the cutting edges 46 of the cutting parts 22', 22", both tools for left-turning machining (FIG. 5a) and tools for right-turning machining (FIG. 5b) can be fitted into the holder 10 without sacrificing any positioning accuracy or rigidity.

Arranged in the tool holder is an axially continuous coolant duct, which is formed in the rear region of the holder 10 by the insertion opening 16 and within the portion 16' accommodating the shank 20 is formed by two axially parallel recesses 60' which are open-edged toward the insertion opening 16 and are bounded there by the shank 20.

To sum up, the following can be stated: the invention relates to a device for fixing a tool 12, preferably designed as a turning tool, to a tool holder 10, the tool having a shank 20 and at least one cutting part 22', 22" and the holder 10 having an insertion opening 16 for accommodating the tool shank 20. To be able to establish an easy to handle and nevertheless rigid clamping connection between the holder 10 and the tool 12 with high positioning accuracy, it is proposed according to the invention that the clamping device 18 has a clamping element 26 which is mounted in such a way that it can rotate to a restricted extent about an axis of rotation 25 in the holder aligned transversely to the axis of insertion 17 of the insertion opening 16 and has a partially cylindrical surface portion 32 which is eccentric in relation to the axis of rotation 25, and that in the shank surface there is arranged an open-edged, partially cylindrical recess 30 which is aligned transversely to the shank axis 28 and into which the clamping element 26 can be screwed by its partially cylindrical surface portion, thereby fixing the tool shank 20.

What is claimed is:

1. A combination of a device, a holder and a tool, the tool having a tool shank and a cutting part, the holder having an insertion opening for accommodating the tool shank, said device having a clamping element mounted for rotation a restricted extent about an axis of rotation in the holder, the clamping element being mounted for rotation at bearing locations of the holder, the axis of rotation being aligned transversely to an axis of insertion of the insertion opening, and the clamping element having a partially cylindrical surface portion which is eccentric in relation to the axis of rotation thereof, the tool having a partially cylindrical recess aligned transversely to a shank axis in a surface of the shank, and wherein the clamping element, during a clamping operation, is screwable at the partially cylindrical surface portion into the partially cylindrical recess, and bends flexibly between the bearing locations to produce a self-locking frictional connection between the bearing locations, thereby automatically setting a position for a cutting edge that is defined with respect to the axis of insertion of the holder in axial and radial directions, as well as in a circumferential direction with respect to the axis of insertion, while fixing the tool shank to the holder and eliminating radial and axial shank backlash in the insertion opening, wherein the clamping element in a flexibly bent fixed state is pressed to a greater extent against a wall of the recess of the tool shank near extreme ends of the clamping element than in a middle region of the wall.

2. The combination as claimed in claim 1, wherein the insertion opening of the holder comprises a cylindrical bore.

3. The combination as claimed in claim 1, wherein the clamping element in the flexibly bent fixed state is lifted in the middle region thereof off the wall of the recess of the shank.

4. The combination as claimed in claim 1, wherein a limiting stop for the tool is arranged on the holder, wherein the recess of the shank opens toward the clamping element when the tool bears against the limiting stop.

5. The combination as claimed in claim 4, wherein the insertion opening, at least in a portion of the holder accommodating the shank, includes a locating hole for the tool shank and the limiting stop comprises an annular shoulder bounding the locating hole.

6. The combination as claimed in claim 4, wherein the limiting stop is arranged in the insertion opening so that, in the direction of insertion, the stop is behind the clamping element.

7. The combination as claimed in claim 1, wherein there is formed on an end face of the shank, remote from the cutting part, a second cutting part, capable of being introduced into a correspondingly lengthened insertion opening.

8. The combination as claimed in claim 1, wherein an axis of the partially cylindrical recess arranged on the shank is aligned perpendicularly to a main cutting force acting at the cutting part.

9. The combination as claimed in claim 1, wherein the clamping element is screwable between a first end position, exposing the insertion opening for passing through of the shank, and a second end position, forming a securement against turning for the clamping element, the end positions being defined by stops.

10. The combination as claimed in claim 9, wherein the clamping element has on one extreme end a head engaged in a stepped bore or turned relief of the holder, the stops being outwardly covered by the head within the stepped bore or turned relief.

11. The combination as claimed in claim 1, wherein the clamping element includes at respective ends wrench sockets.

12. The combination as claimed in claim 1, including a coolant duct passing axially through the holder.

13. The combination as claimed in claim 12, wherein, outside a portion of the holder accommodating the shank, the coolant duct is formed by the insertion opening and, within the portion accommodating the shank, the coolant duct is formed by at least one axially parallel recess which is open-edged toward the insertion opening and bounded by the shank.

14. A combination of a device, a tool holder and a tool having a shank and a cutting part, the device securing the tool to the tool holder, the holder having an insertion opening for accommodating the tool shank and a mechanism recess which opens into the insertion opening, the device including a clamping mechanism received in the mechanism recess, the clamping mechanism including a clamping element mounted for rotation a restricted extent about an axis of rotation in the holder, the axis of rotation being aligned transversely to and spaced from an axis of insertion of the insertion opening, a surface portion of the clamping element comprising an eccentric surface portion eccentric in relation to the axis of rotation of the clamping element, another surface portion of the clamping element being a substantially flat surface portion defining a plane non-intersecting with respect to the axis of rotation, such that the clamping element has a substantially cylindrical shape except for the flat surface portion, the clamping element being mounted for rotation by bearings, the clamping element being flexible to enable bending thereof, and the clamping mechanism including a head mounted at an end of the clamping element for enabling rotation of said clamping element in the mechanism recess;

said tool including a receiving recess having a partially cylindrical shape for receiving said clamping element, the receiving recess formed with a recess surface;

whereby, in operation, the flat surface portion of the clamping element is aligned with the insertion opening to enable the insertion opening to receive the tool, and when the receiving recess of the tool is aligned with the mechanism recess, the clamping element is rotated so that the eccentric surface portion enters and directly contacts the recess surface of the receiving recess of the tool, the clamping element bending to form a self-locking frictional connection fixing the tool shank with a three point bearing contact.

15. The combination as claimed in claim 14 including cooling recesses formed in the insertion opening to enable cooling of the tool.

* * * * *